Jan. 1, 1963   H. C. MORGAN   3,071,762
ANALOG-TO-DIGITAL CONVERTER
Filed Nov. 9, 1956   5 Sheets-Sheet 1

INVENTOR.
HARRY C. MORGAN
BY *Fredric B. Schramm*
ATTORNEY

INVENTOR.
HARRY C. MORGAN

Jan. 1, 1963  H. C. MORGAN  3,071,762
ANALOG-TO-DIGITAL CONVERTER
Filed Nov. 9, 1956  5 Sheets-Sheet 3

INVENTOR.
HARRY C. MORGAN
BY
ATTORNEY

Jan. 1, 1963 H. C. MORGAN 3,071,762
ANALOG-TO-DIGITAL CONVERTER
Filed Nov. 9, 1956 5 Sheets-Sheet 4

INVENTOR.
HARRY C. MORGAN
BY
ATTORNEY

United States Patent Office 3,071,762
Patented Jan. 1, 1963

3,071,762
ANALOG-TO-DIGITAL CONVERTER
Harry C. Morgan, Woodland Hills, Calif., assignor to North American Aviation, Inc.
Filed Nov. 9, 1956, Ser. No. 621,397
5 Claims. (Cl. 340—347)

This invention relates to high speed recording of variable quantities. An object of the invention is to produce records of one or more variable analog-signal quantities in digital code at very high speed.

Another object is to produce a record which may be read back rapidly or converted to other data.

Still another object is to provide photographic recording of rapidly produced coded signals of variable quantities.

An additional object is to record rapidly-produced signals within the space available upon tape or film traveling at reasonable rates of speed and without consumption of excessive lengths of tape or film.

A further object is to provide a recording system whereby a large number of signals may be recorded within a relatively small area of recording sheet material or film.

A further object is to provide an improved method and apparatus for converting analog signals into digital signals and into digital code records capable of rapid recording and read out.

Other and further objects, features and advantages of the invention will become apparent as the description proceeds.

In carrying out the invention in accordance with a preferred form thereof an analog transducer is provided, such as a temperature or pressure gage, for example, which produces a voltage proportional to the magnitude of the measured quantity. A recycling clamp is provided which holds the voltage for a minute increment of time at a fixed value; and a cathode ray oscilloscope tube is provided with a vertical-deflection circuit, to which the voltage in the recycling clamp is applied. The cathode ray oscilloscope tube is provided also with a horizontal or transverse sweep circuit, with a triggered sweep generator which triggers the recycling clamp for each horizontal sweep. The arrangement is thus such that, each time the measurement-representing voltage is clamped, the beam is deflected vertically proportional to the magnitude of the quantity measured and also swept horizontally.

The screen of the cathode ray oscilloscope is provided with a mask having a pattern conforming to that of binary digital code with light and dark areas such that as the beam is swept horizontally, it is interrupted by dark areas of the mask at such intervals as to correspond to the binary code for the magnitude of the quantity. Different levels of the mask measured vertically have different light and dark areas, arranged to represent the digital binary code for successively larger quantities, so that the vertical deflection of the beam proportional to the magnitude of the measured quantity results in bringing the beam into the row of light and dark areas producing the appropriate digital code interruptions.

For utilizing the interruptions of the cathode ray beam in accordance with the binary digital code as explained, a photoelectric tube is provided with a sutiable focusing system so that the photoelectric tube "sees" the row of the cathode ray screen mask along which the beam is swept and converts the interruptions of the cathode ray beam into corresponding electrical signals or pulses representing the binary digital code. Means are provided for converting the electrical signals into successive visual records on moving tape or film. Preferably, for this purpose, a second cathode ray tube is provided having a control grid excited in accordance with electrical pulses representing binary digital code signals and a photographic film is moved along the screen of the second cathode ray tube so as to record the electrical signals on the film. Preferably, the second cathode ray tube is provided with a sweep circuit having a fraction of the sweep rate of the horizontal sweep circuit of the first cathode ray tube, for example, a sweep rate one-tenth that of the cathode ray tube so that ten pulse code groups or binary records of electrical quantities are compressed onto each successive line of the photographic film.

In order that a plurality of different analog signals may be recorded on the same film, a plurality of analog transducers are preferably provided with a commutator preferably of electronic type interposed between the analog transducers and the recycling clamp and having a synchronizing connection to the triggered sweep circuit which triggers the recycling clamp.

A better understanding of the invention will be afforded by the following detailed description considered in conjunction with the accompanying drawings in which FIG. 1 is a schematic diagram of an embodiment of the invention;

Like reference characters are utilized throughout the drawing to designate like parts.

Figure 1:
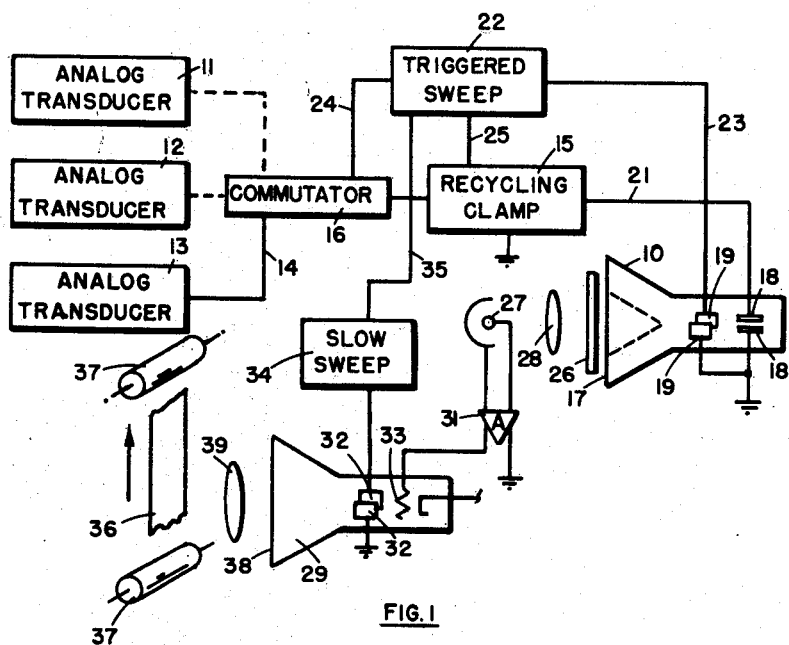

In the system illustrated in FIG. 1, there are a plurality of analog transducers 11, 12, 13, etc., provided with output lines 14 to a recycling clamp 15 with a commutator 16 interposed for successively connecting the output line of one of the analog transducers at a time to the recycling clamp 15. The commutator 16 is of a high speed type preferably electronic, such as an electronic switch arrangement of the serially connected flip-flop type, for example.

A cathode ray tube 10 is provided which is of conventional type having a screen 17, a suitable electron gun (not shown), and transverse sweep circuits represented in this case as being of the electrostatic type including a pair of deflection plates 18 for deflection in one direction, for example, vertical direction, and a pair of deflection plates 19 for deflection in the transverse direction, for example, the horizontal direction to produce a transverse sweep. An output line 21 from the recycling clamp 15 is connected to the vertical sweep plates 18 for deflecting the cathode ray beam vertically in response to the magnitude of the voltage clamped in the recycling clamp 15, corresponding to the last value of the output voltage of one of the analog transducers such as the transducer 13.

A triggered sweep generator 22 is provided which has a saw-tooth sweep voltage output through a line 23 to the horizontal deflection plates or sweep plates 19 of the cathode ray tube 10 and a synchronizing connection 24 with the commutator 16 as well as a synchronizing connection 25 to the recycling clamp 15. The arrangement is such that for each horizontal sweep of the cathode ray beam, that is to say for each cycle of the saw-tooth sweep wave produced by the sweep generator 22, the commutator 16 and the recycling clamp 15 are triggered synchronously therewith so as to apply voltages in order from the analog transducers 11—13, etc., to the recycling clamp 15, to clamp each of these voltages momentarily and to cause the clamped voltage to be applied to the vertical deflection plates 18 during the fraction of the horizontal sweep of recording scope 29 allotted to each of the analog transducers. Triggered sweep generators, recycling clamps, commutators and synchronizing means do not constitute a part of my present invention and conventional mechanism therefor may be employed. Specific details of this mechanism and the circuits therefor are not shown in the drawing.

Figure 2:
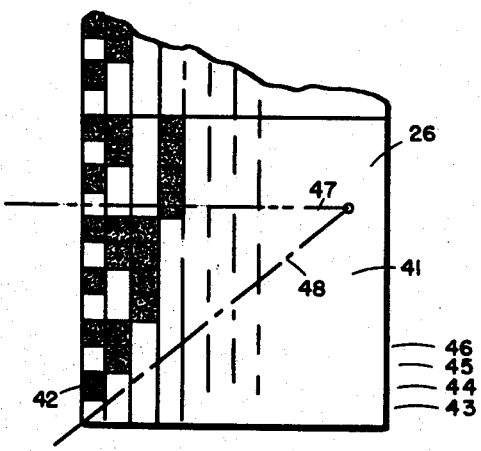
FIG. 2 is a fragmentary diagram of a mask for a cathode ray tube illustrating the manner of converting signals into binary code by light and dark areas in the mask.

For the purpose of converting the image of the cathode ray beam of the tube 10 on its screen 17 into binary digital code signals or pulses according to the vertical deflection of the beam, a mask 26 is mounted over the face of the cathode ray tube 10 preferably directly against the screen 17 although shown spaced for clarity in FIG. 1. The mask 26 is provided with a binary digital code pattern as illustrated in FIG. 2, as will be explained in further detail hereinafter. For converting the visual images of the cathode ray beam as intercepted by the mask 26 into electrical pulses, a photo responsive device, such as a photoelectric tube 27 is provided with a focusing means 28 represented by a single lens for simplicity in the drawing, mounted between the mask 26 and the photoelectric tube 27. An electrical responsive recording device, such as a second cathode ray tube 29 is provided so arranged that its beam intensity is responsive to the electrical output of the photoelectric tube 27 preferably through an amplifier 31.

The cathode ray tube 29 may also be conventional in form although in this case no vertical deflection is required and only the horizontal deflection mechanism or horizontal sweep means, such as electrostatic sweep plates 32 are utilized. A conventional beam control grid 33 is connected to the output of the photoelectric amplifier 31. Sweep plates 32 are connected to a sweep generator preferably a separate, fractional-speed sweep generator 34, in cases where a plurality of analog quantities are to be recorded. For example, with ten separate analog transducers 11, 12, 13, etc., where it is desired to record ten separate analog quantities in each line of the final record, the sweep generator 34 has a sweep rate one-tenth that of the triggered sweep generator 22. A synchronizing connection 35 is provided between the triggered generator 22 and the fractional rate sweep generator 34 so that a single sweep wave is applied to the sweep plates 32 of the cathode ray tube 29 during each ten sweeps of the saw-tooth wave applied to the sweep plates 19 in the cathode ray tube 10.

A light-responsive record tape, such as a 35 mm. motion picture film 36 is provided with a suitable film transport mechanism represented by rolls 37 for carrying the photographic film 36 vertically (assuming horizontal sweep of the beam of the tube 29) in optical relation to the screen 38 of the tube 29. Suitable focusing means represented, for simplicity, by a lens 39 are interposed between the tube screen 38 and the film transport means.

The pattern of the mask 26 is illustrated in FIG. 2. It is to be observed that the light areas 41 and the dark areas 42 are so arranged that binary digital code for successively larger quantities is represented by the beam interception at successively higher vertical levels. For example, if the beam is at the level represented by the horizontal line 43, it will not be intercepted or interrupted, which corresponds to the zero digit in binary code or zero quantity. On the other hand at the level represented by the horizontal line 44, the beam will be intercepted once as it is swept horizontally representing the unit digit in binary code or the decimal number 1. If the cathode beam is swept along the horizontal line 45 from right to left, there will be an interruption followed by no interruption representing the binary numeral 10 corresponding to decimal number 2. Likewise, along the horizontal line 46 would be two successive interruptions and no interception of the cathode ray beam representing the binary numeral 11 corresponding to the decimal number 3. As can be seen from the diagram of FIG. 2 for successively higher levels of the beam produced by the vertical deflection plates, there result the binary signals 100 representing decimal number 4, 101 representing decimal number 5, 110 representing decimal number 6, 111 representing decimal number 7, etc. Other codes, variations of binary, or not binary, could also be used.

By way of illustration, it is assumed in the foregoing discussion of FIG. 2 that the beam is swept from right to left during the recording portion of the trigger sweep cycle and blanked out on the return stroke. However, if desired, the binary digital signal representations may be produced in reverse order with movement from left to right along the horizontal line 47 and return sweep or high speed fly-back being along the diagonal line 48 so as not to traverse the binary code pattern of the mask 26. For simplicity, in FIG. 1, no fly-back blanking circuit has been illustrated although such a circuit may be provided as explained in connection with FIG. 4. Since the vertical level of the path 47 swept by the cathode ray beam is determined by the magnitude of the analog quantity, the binary code representation also represents the magnitude of the analog quantity.

Figure 3:
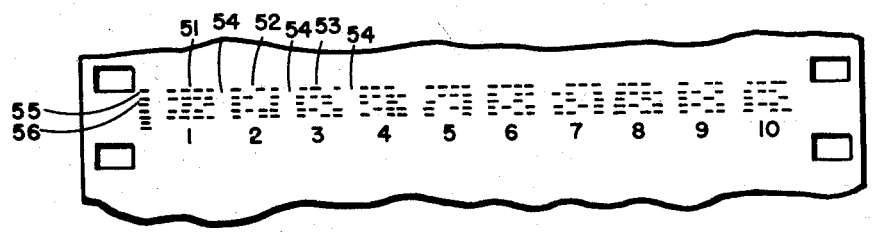
FIG. 3 is a fragmentary view of a photographic film such as 35 mm. motion picture film, for example, illustrating successive groups of binary code signals recorded thereon.

The appearance of recorded signals for a seven-digit code and ten different analog quantities recorded in each line of the film 36 is illustrated in FIG. 3. The time period of the sweep wave produced by the triggered sweep generator 22 and the instants of the synchronization with the commutator 16, slow sweep 34 and recycling clamp 15 are so chosen that successive code groups or pulses 51, 52, 53, etc., are separated by spaces 54. As explained hereinafter, successive cue signals 55, 56, etc., may also be recorded on the film 36 in successive rows of the pulsed code groups 51, 52, 53, etc. It is to be understood that the binary code is represented by the visual record on the strip 36 by the presence or absence of a dark mark on the film 36 in each of seven successive areas in one of the rows of one of the code group, such as group 51. A dark mark in an area, for example, represents the digit one, and absence of the mark represents the digit zero, or vice versa, according to the circuit arrangement in the amplifier 31.

The invention is not limited to particular speeds of operation. It has been found, however, that where high-speed recording is desired, 1,000,000 samples per second may be recorded by running the film 36 at less than 100 inches per second, with the sweep generator 34 producing a 100,000 cycle per second saw-tooth wave.

If desired, the beam of the cathode ray tube 10 may be utilized to produce the record directly upon the photographic film 36. In this case, the film transport means carrying the film 36 is mounted in front of the cathode ray tube screen 17 or is mounted directly against the mask 26. In the arrangement illustrated in FIG. 4, a focusing lens system 28 is mounted between the film 36 and the mask 26 so that the image of the radiant or emitted energy beam 61, except where intercepted by dark spots on the mask 26, appears on the film 36 as the beam is horizontally deflected by the sweep plates 19.

Figure 4:
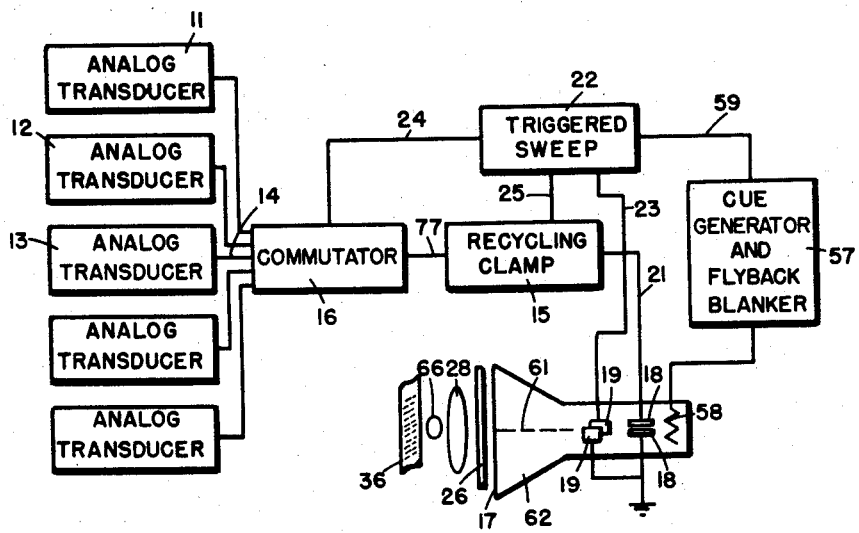
FIG. 4 is a schematic diagram of a modification of the arrangement of FIG. 1 in which the binary code signals are recorded directly upon the photographic film from a single cathode ray tube without the interposition of a photoelectric tube.

A cylindrical lens 66 may be interposed between the focusing system 28 and the film 36 as illustrated in FIG. 4 so as to compress the masked images of the cathode ray spots to approximately a line and produce the code signals in relatively narrow bands successively upon the film 36 as the film 36 travels across the face of the tube 62. In this embodiment of the invention one code group per line is recorded unless the binary masking code is repeated several times across the face of the tube.

Figure 5:
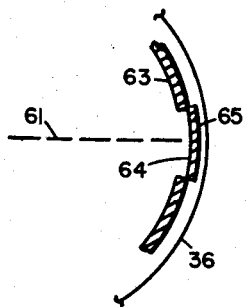
FIG. 5 is a fragmentary diagram of a cross section of the screen portion of a special form of cathode ray tube for enabling the record of the cathode ray beam locations to be compressed into a relatively narrow band in the recording arrangement of the apparatus of FIG. 4.

To reduce the size of the equipment, a specially constructed cathode ray tube 62 may be employed having a glass screen wall 63, as illustrated fragmentarily in FIG. 5, having an opening in the glass replaced by a window 64 of aluminum, mica or other substance which is highly transparent to cathode rays. A mask 65 of reduced vertical dimension is provided which covers the window 64 and employs the pattern illustrated in FIG. 2 but vertically compressed. Consequently, even though time serial recording is employed, the records appear substantially in a straight line or in rows on the film 36.

In this embodiment for recording 100,000 samples per second, the film 36 may be driven at 100 inches per second.

Owing to the fact that the saw-tooth wave produced by the triggered sweep generator 22 is very steep on the return portion of the wave, the fly-back or return sweep of the cathode ray beam is so rapid as to produce a trace on the film 36 which is either so faint as to be imperceptible or cause no difficulties in reading the signal produced during the forward sweep. However, if desired, a fly-back blanker 57 may be provided which is connected to the control grid 58 of the tube 62 for extinguishing the beam by depressing the voltage of the grid 58 during the return sweep or fly-back of the cathode ray beam 61. It is to be understood that a synchronizing connection 59 is provided between the tube 62 and the fly-back blanking circuit 57.

The fly-back blanker 57 may, if desired, also include a cue generating circuit synchronized with the sweep generator 22 through the line 59 for the purpose of producing the cue marks 55 and 56 (illustrated in FIG. 3) during an initial portion of the forward sweep.

Although the photographic film 36 may constitute conventional motion picture film or photographic recorder film, the invention is not limited thereto and does not exclude the use of xerographic technique which would allow the cathode ray beam to pass through the thin aluminum window and electrically charge a special resin powder spread upon a base tape at the time of recording. In this technique the uncharged resin is shaken off and the charged resin still adhering is fixed by heat.

Figure 6:
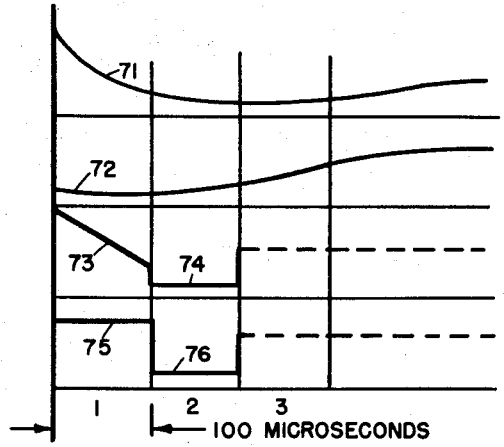
FIG. 6 is a graph illustrating operation of the recycling clamp.

The function of the recycling clamp 15 as illustrated in FIG. 6 of the drawing in which the instantaneous magnitudes of a continuously variable quantity are represented by a curve 71 and the magnitudes of another variable quantity are represented by curve 72. Sampling portions of the curves 71 and 72 in successive time intervals, for example 100 microsecond increments of time, would result in the composite curve having segments 73 and 74.

In order that the continuously varying analog quantities represented by the curve segments 73 and 74 may be converted to digital code, the values of the curved segments 73 and 74 at some predetermined point in the curve or the average value thereof are detected and held during the period that the digital code is being produced. For example, by the use of a recycling detector circuit of the type illustrated in FIG. 7, the initial value of the curve segment 73 is held for an increment of time, for example 100 microseconds as represented by the horizontal line 75 in FIG. 6, and the initial value of the curve 74 is held during the next 100 microseconds as represented by the horizontal line segment 76. It is to be understood that other analog quantities are detected in successive 100 microsecond time intervals.

Considering, for example, the variable quantity represented by the curve 71, a voltage corresponding thereto produced by the analog transducer 13, FIG. 4, is applied to the input terminal 77 of the recycling clamp 15 in response to the action of the commutator 16 under the control of triggered sweep generator 22.

Figure 7:
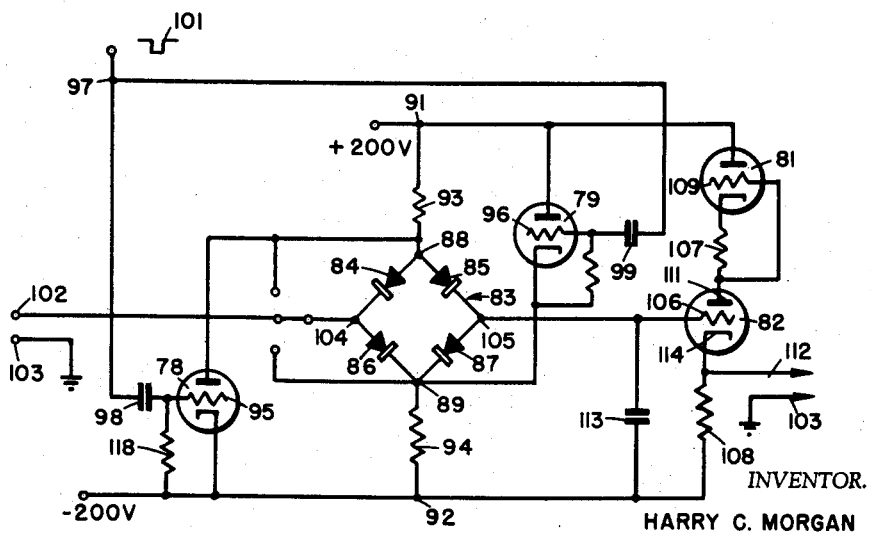
FIG. 7 is a circuit diagram of the clamp.

The circuit of FIG. 7 comprises a pair of switching tubes 78 and 79 shown as triodes which may constitute two halves of a twin triode tube, a cascode cathode follower comprising triode elements 81 and 82 which may be parts of a twin triode, and a diode array 83 which may consist either of thermionic discharge elements or semi-conductors, for example, silicone diodes. As shown, the diode array 83 comprises four diodes 84, 85, 86 and 87 connected as a bridge with polarity such that positive current flows from a terminal 88 to a terminal 89. The terminals 88 and 89 are connected to a positive power supply terminal 91 and a negative power supply terminal 92 through resistors 93 and 94, respectively.

The switching tube 78 is connected between the terminals 88 and 92 so as to bypass the diode array 83 and the diode resistor 94; whereas the switching tube 79 is connected between the terminals 91 and 89 so as to bypass the diode resistor 93 and the diode array 83. The switching tubes 78 and 79 have control electrodes or grids 95 and 96, respectively. The control elements 95 and 96 are coupled to a gate terminal 97 through coupling condensers 98 and 99. The triggered sweep generator 22 is arranged to supply a negative trigger pulse 101 to the gating terminal 25.

Input terminals 102 and 103 are provided at which the analog input signal from the commutator 16 or one of the analog transducers 13 is supplied. As shown, the analog input terminal 103 is grounded and the analog input terminal 102 is connected to the diode array 83. For example, where a four-diode bridge array is employed, the terminal 102 may be connected to a junction terminal 104 of the diode array 83. In this arrangement, a second diode array junction terminal 105 is connected to a control electrode 106 of the cascode cathode follower tube 82.

In the cascode cathode follower, the tubes 81 and 82 are connected in series between the positive power supply terminal 91 and the negative terminal 92. There is a cathode resistor 107 connected in the cathode line of the tube 81 to the anode line of the tube 82 and the tube 82 is provided with a cathode resistor 108. The tube 81 has a control electrode 109 connected to the anode 111 of the tube 82 for stabilizing the tube 81. An output terminal 112 is connected to the cathode 114 of the tube 82, and the ground terminal 103 serves as a second output terminal.

The cascode follower tubes 81 and 82 provide a high degree of stability by reason of the feedback employed.

The clamping circuit of FIG. 7 operates in the following manner: when there is no signal applied to the input terminals 102 and 103 the switching tubes 78 and 79 are heavily conducting, pulling the potential of the diode array terminal 88 well below that of the diode array terminal 89. Consequently, the diodes 84 to 87 are cut off and a charge upon a storage condenser 113 is isolated. Since the charge upon the condenser 113 controls the potential of the cascode cathode follower control electrode 106, it determines the voltage output at the terminals 112 and 103.

However, when the brief strong negative pulse 101 is applied to the grids 95 and 96 of the switching tubes 78 and 79, they are cut off or rendered nonconducting. The voltage at this time is determined by the voltage drops across the resistors 93 and 94, and the diodes 84 to 87, which have become conducting, and the voltage is also modified by the analog signal at the input terminal 102 which is connected to the junction 104 of the diode array 83. Consequently, the voltage at the junction terminal 105 and therefore at the output terminal 112 will rise and fall with the input signal, during the brief application of pulse 101 and remains at such level until the next pulse 101.

Figure 8:
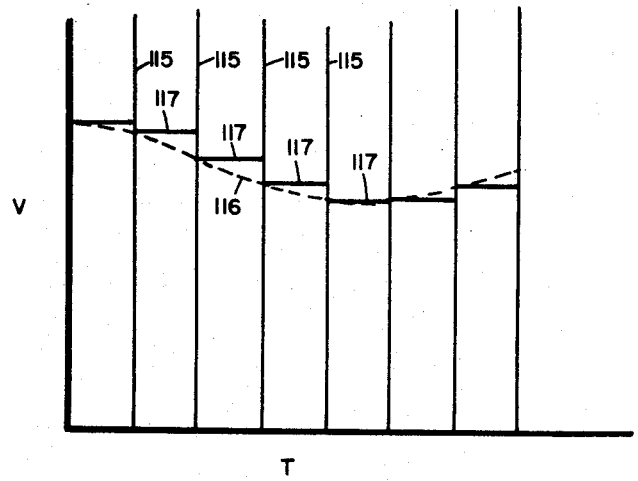
FIG. 8 is a graph illustrating the principle of operation of a recycling clamp.

The function of the recycling clamp of FIG. 7 is illustrated in FIG. 8 in which the vertical lines 115 represent the times at which the switching tubes 78 and 79 are rendered nonconducting. The dotted curve 116 represents the analog signal curve. The analog value is read into the clamp of FIG. 7 at each of the instants represented by vertical lines 115 as shown by horizontal lines and line segments 117. The value of the output voltage is preserved at points between read-out by the storage condenser 113 of FIG. 7.

The full four-diode bridge array 83 of FIG. 7 provides cathode hum balance as well as cancelling out the effect of diode contact potentials and their variations with changing heater voltage if thermionic valves are employed. However, it is unnecessary to employ a four-diode array when silicone diodes are employed. For example, the diodes 84 and 86 may be omitted, in which case the input terminal 102 may be connected either to the terminal 88 or to the terminal 89.

For simplicity, if desired, the cathode follower 81 may also be omitted with the anode 111 of the tube 82 connected directly to the power supply terminal 91 so as to employ a simple cathode follower output stage.

An important factor to be taken into account is the selection of the diodes and the condenser 113. After diode conduction, current carriers are left over which briefly (order of 1 microsecond or less) permit negative current conduction. In order to avoid any possibility of this effect causing an error in the charge left on condenser 113, the diodes are carefully matched for the negative conduction effect so as to minimize the error. The accuracy of the operation is least affected by input impedance when the terminal 88 (assuming connection there of the analog input terminal 102), is balanced to ground potential.

The invention is not limited to the use of any particular constants or tubes. However, satisfactory operation is obtained where the switching tubes 78 and 79 are elements of a type 5687 twin triode and the diodes 84—87 are of the 1N214 type with 200 volt positive power supply for the terminal 91, and 200 volt negative power supply at the terminal 92, the resistors 93 and 94 constituting 66,000 ohm resistors and the resistor 118 constituting a 1,000 ohm resistor. In the simplified circuit, with only two triodes the resistor 93 may be 133,000 ohm, resistor 94 may be 30,000 ohm, and the negative power supply voltage of the terminal 92 may be minus 30 volts.

Figure 9:
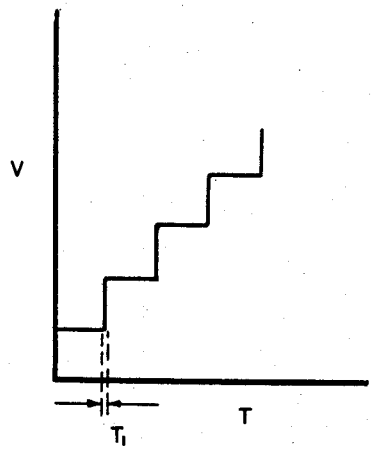
FIG. 9 is a graph of a step sweep wave form for application to an oscilloscope.

The analog holding clamp as illustrated in FIG. 7 is not required if the code is read-out very fast on the cathode ray tube 62 illustrated in FIG. 4 by utilizing a step-sweep as illustrated in FIG. 9. With this sweep voltage applied to the horizontal deflection plates 19 of the tube 62, the cathode ray beam 61 is caused to cross the screen 17 in a series of quick jumps with long rest periods in between. The code signals are read-out onto the film during the quick jumps. Although the fast voltage change is preferably linear, it need not necessarily be so. Such a wave may be produced by a flip-flop circuit of the type illustrated in FIG. 10, with the rise and fall times during conduction change serving for the fast voltage change.

Flip-flop output resistors 119a, 119b, 119c and 119d are in parallel circuits each connected in series with a step-sweep output resistor 121. The resistors 119a, 119b, 119c and 119d are selected to have resistances successively different by a ratio of one-half, so that when each additional flip-flop unit becomes conducting, additional current flows through the resistor 121 to increase the current flowing through stepwise and therefore the voltage drop across it. For example, the resistor 119a may be 2,000,000 ohm, 119b may be 1,000,000, 119c may be 500,000, and 119d may be 250,000 and 121 may be 10,000 ohms.

Figure 10:
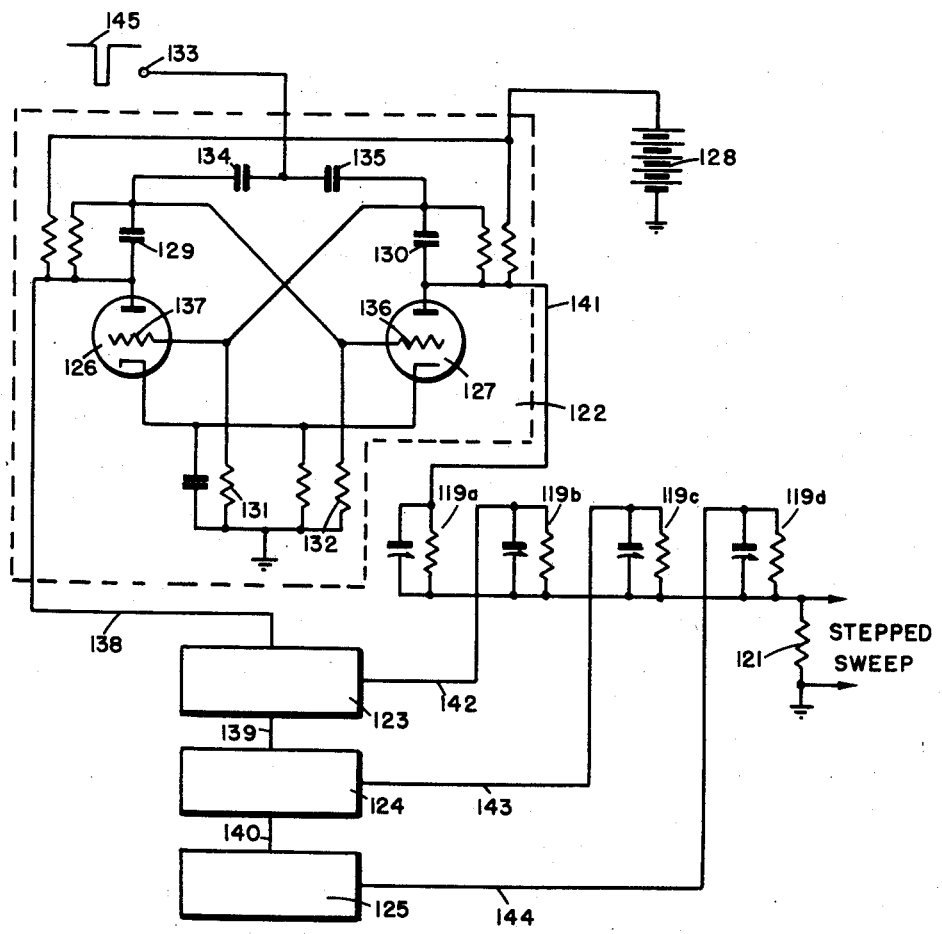
FIG. 10 is a circuit diagram of a generator which may be utilized for producing the sweep wave of FIG. 9.

The circuit of FIG. 10 may comprise conventional serially arranged flip-flop units 122, 123, 124 and 125. The internal connections and circuits of the units are similar and are illustrated only for the unit 122. Each of the flip-flop units, such as the unit 122, is a bistable thermionic valve circuit device with a pair of triode tubes 126 and 127 connected to a common power supply 128 through conventional load resistors and with grid circuits cross coupled through condensers 129 and 130 and resistors 131 and 132, and with input coupled from a gating terminal 133 through condensers 134 and 135 connected to grids 136 and 137 of the tubes 127 and 126, respectively.

One or the other of the tubes 126 and 127 is normally conducting. When the negative pulse represented by wave form 145 is applied to the grids 136 and 137, whichever tube has been conducting becomes nonconducting so as to drive upward the grid voltage of the other tube and render it conducting. The successive flip-flop units 123, 124 and 125 are coupled to anode terminals of the preceding unit through lines 138, 139 and 140, respectively, the anode in question being the one which is driven negative in response to the negative input gating pulse. On the other hand, each flip-flop unit 122 to 125 has an output conductor 141, 142, 143 or 144 connected to the other anode of the unit so that it is the one which is driven positive in response to the negative input pulse. Consequently, with each step in progression of the operation of the flip-flop tube units 122, 123, 124 and 125, one of the output resistors 119a, 119b, 119c or 119d of lower resistance than the preceding is connected to the anode which has been driven positive. Progressively larger currents are thus caused to flow through the resistor 121 so as to produce a sixteen step voltage sweep as illustrated in FIG. 9.

Figure 11:
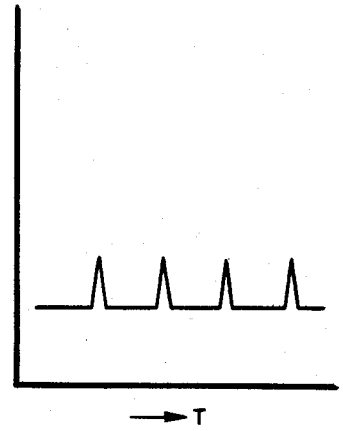
FIG. 11 is a graph of a conventional horizontal wave form.

The step sweep of this type may also be used in the coding system of FIG. 1 in which two cathode ray tubes are employed. The circuit of FIG. 10 is then utilized as the slow sweep 34 in the arrangement of FIG. 1. In this case a horizontal sweep wave of the form illustrated in FIG. 11 is applied to the sweep plates 19 of the tube 10 of FIG. 1. Such a sweep wave may be produced by conventional manner in the sweep circuit 22.

Since the curves 75 and 76 and other segments of the output curve of the clamping circuit are horizontal, the vertical deflection of the cathode ray beam produced by the plates 18 remains essentially constant for the portion of the sweep corresponding to one code group and follows the horizontal line 47 shown in FIG. 2 so as to produce the necessary electrical signals through the photoelectric tube 27 to represent the binary code in the case of the embodiment of FIG. 1.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A method of recording variable quantities which comprises the steps of producing a voltage having a magnitude dependent upon the magnitude of a quantity to be recorded, generating a cathode ray beam and sweeping it in a sweep direction at a substantially uniform time rate, deflecting the beam in a direction transverse to the sweep direction proportionately to the generated voltage, intermittently intercepting the beam at points along the sweep thereof in a digitally coded relation dependent upon the transverse deflection of the beam, generating a second cathode ray beam, sweeping the second beam laterally at a sweep rate which is a fraction of the sweep rate of the first cathode ray beam and in synchronism therewith, interrupting the second cathode ray beam responsive to the interception of the first cathode ray beam and recording the impulses of the second cathode ray beam in lateral rows upon a recording sheet to produce digital code representative of the variable quantity to be recorded.

2. The method of recording a plurality of variable quantities which comprises the steps of producing voltages, each dependent upon the magnitude of one of the variable quantities to be recorded; generating a cathode ray beam, sweeping the cathode ray beam in a sweep direction at a time rate; deflecting the cathode ray beam transversely to the sweep direction in successive sweeps, successive deflections being proportional to the voltages representing successive variable quantities to be recorded; intercepting the cathode ray beam intermittently as it is being swept in the sweep direction with a pattern dependent upon the deflection in the transverse direction; generating a second cathode ray beam; sweeping the second cathode ray beam along a time sweep axis at a rate which is the fraction of the sweep rate of the first cathode ray beam and in synchronism therewith; intermittently interrupting the second cathode ray beam in accordance with the interception rate of the first cathode ray beam and causing the second cathode ray beam to impinge upon a record sheet to form rows of digital records corresponding in value to the magnitude of the variable quantities to be recorded.

3. A high speed recorder comprising in combination an analog transducer for converting a variable quantity into a voltage; a recycling clamp having an input from said transducer for momentarily maintaining a substantially fixed voltage at a value attained during an increment of time by the said quantity-representing voltage; cathode ray generating means for generating a deflectible beam and having a screen, a time sweep circuit and a deflection circuit; a sweep generator having an output connected to the sweep circuit and a synchronizing connection with the recycling clamp, the recycling clamp being connected to the deflection circuit of the cathode ray beam for deflecting the beam transversely to the time sweep in accordance with the voltage fixed by said clamp; a matrix covering the screen of the cathode ray tube having a digitally coded pattern thereon whereby the beam as it is swept along the sweep axis is intermittently interrupted by the pattern and the interruptions are dependent upon the transverse deflection of the beam to produce beam interruption in accordance with a digital code having a numerical value representing the transverse deflection; a photoelectric responsive device exposed to the screen matrix of the cathode ray tube; a second cathode ray tube having a beam control electrode responsive to the photoelectric responsive device; a sweep circuit having a sweep rate which is a fraction of the sweep rate of the first cathode ray tube; a synchronizing connection between the second sweep circuit and the said triggered sweep circuit; a photographic-film transport means for carrying a photographic film along the path of the cathode ray beam of the second cathode ray tube, whereby records are produced in accordance with the coded interruption of the second cathode ray beam.

4. Apparatus as in claim 3 in which a plurality of analog transducers are provided, a commutator is interposed between said transducers and the recycling clamp for presenting a plurality of different voltages in succession for successive independent increments of time to the recycling clamp, representative of the magnitudes of different variable quantities to be recorded, and a synchronizing connection between the sweep generator and the commutator for causing digital code representative of the succesive variable quantities to be produced in succession on film carried in the film transport means.

5. Apparatus of the class described comprising a plurality of analog signal input channels, commutating means responsive to signals in said channels for successively presenting said signals at an output thereof, clamping means responsive to said commutating means for clamping for a selected period each signal presented at said commutating output, a cathode ray tube having a screen and means for generating a cathode ray beam, sweep generating means for causing said beam to repetitively sweep said screen in a first direction, means responsive to said clamping means for deflecting said beam in a second direction in accordance with each clamped signal, means for synchronizing said commutating, clamping, and sweep generating means, output means for viewing said screen, and a mask having a predetermined pattern of apertures interposed between said screen and said output means.

References Cited in the file of this patent
UNITED STATES PATENTS

| | | |
|---|---|---|
| 2,251,525 | Rosenthal | Aug. 5, 1941 |
| 2,265,337 | Beatty | Dec. 9, 1941 |
| 2,402,058 | Loughren | June 11, 1946 |
| 2,516,886 | Labin et al. | Aug. 1, 1950 |
| 2,533,242 | Gridley | Dec. 12, 1950 |
| 2,596,741 | Tyler et al. | May 13, 1952 |
| 2,678,254 | Schenck | May 11, 1954 |
| 2,733,358 | Carapellotti | Jan. 31, 1956 |
| 2,781,445 | Stocker | Feb. 12, 1957 |
| 2,782,307 | Sivers et al. | Feb. 19, 1957 |
| 2,791,764 | Gray et al. | May 7, 1957 |
| 2,807,663 | Young | Sept. 23, 1957 |

OTHER REFERENCES

An Analog-to-Digital Converter for Serial Computing Machines; Gray, Levonian and Rubinoff; Proceedings of the I.R.E., October 1953; pages 1462–1465.

Photographic Techniques for Information Storage; Same P. I.R.E., pages 1421–1425; by King, Brown and Ridenour.